United States Patent
Nathans et al.

(10) Patent No.: US 7,877,322 B2
(45) Date of Patent: *Jan. 25, 2011

(54) PREFERRED CREDIT INFORMATION DATA COLLECTION METHOD

(76) Inventors: Michael G. Nathans, 1324 Cape St., Suite 174, Annapolis, MD (US) 21401; Marcia A. Goldstein-Nathans, 1324 Cape St., Suite 174, Annapolis, MD (US) 21401

( * ) Notice: Subject to any disclaimer, the term of this patent is extended or adjusted under 35 U.S.C. 154(b) by 1127 days.

This patent is subject to a terminal disclaimer.

(21) Appl. No.: 11/467,408

(22) Filed: Aug. 25, 2006

(65) Prior Publication Data

US 2007/0067235 A1    Mar. 22, 2007

Related U.S. Application Data

(62) Division of application No. 10/309,018, filed on Dec. 4, 2002, now Pat. No. 7,139,734.

(51) Int. Cl.
G06Q 40/00    (2006.01)
(52) U.S. Cl. .......................................... 705/38; 705/40
(58) Field of Classification Search .................. 705/26, 705/35–40
See application file for complete search history.

(56) References Cited

U.S. PATENT DOCUMENTS

| | | | |
|---|---|---|---|
| 5,274,547 A * | 12/1993 | Zoffel et al. | 705/38 |
| 5,383,113 A | 1/1995 | Kight et al. | |
| 6,023,687 A | 2/2000 | Weatherly et al. | |
| 6,049,784 A | 4/2000 | Weatherly et al. | |
| 6,088,686 A | 7/2000 | Walker et al. | |
| 6,112,190 A | 8/2000 | Fletcher et al. | |
| 6,119,103 A | 9/2000 | Basch et al. | |
| 6,311,169 B2 | 10/2001 | Duhon | |
| 6,529,885 B1 | 3/2003 | Johnson | |
| 6,587,841 B1 | 7/2003 | DeFrancesco et al. | |
| 6,594,633 B1 | 7/2003 | Broerman | |
| 6,684,196 B1 | 1/2004 | Mini et al. | |
| 6,845,448 B1 | 1/2005 | Chaganti et al. | |

(Continued)

FOREIGN PATENT DOCUMENTS

WO    01/59670 A1    8/2001

(Continued)

OTHER PUBLICATIONS

Graves, S., "Company aims to ease rental problems for all, Rentport creates credit for renters", The Press Democrat. Santa Rosa, Calif., Aug. 19, 2000.*

(Continued)

Primary Examiner—Olabode Akintola

(57) ABSTRACT

A creditor creates a lock box at a financial institution. The lock box includes an escrow provision. A consumer makes regularly scheduled payments to the financial institution and designates the payment either for the creditor's lock box or for the escrow account. The financial institution reports all payments and escrow events to the creditor and to the credit payment data repository. All credit payment data maintained in the credit data repository is maintained securely and will not be released without the consent of the consumer. The credit data maintained in the repository is used to report a credit score, which occurs only when the consumer authorizes the release of the data.

12 Claims, 3 Drawing Sheets

U.S. PATENT DOCUMENTS

| | | |
|---|---|---|
| 6,968,348 B1 | 11/2005 | Carone et al. |
| 7,016,877 B1 | 3/2006 | Steele et al. |
| 7,069,234 B1 | 6/2006 | Cornelius et al. |
| 7,069,451 B1 | 6/2006 | Ginter et al. |
| 7,076,462 B1 | 7/2006 | Nelson et al. |
| 7,139,734 B2 | 11/2006 | Nathans et al. |
| 2002/0026411 A1 | 2/2002 | Nathans et al. |
| 2002/0072927 A1 | 6/2002 | Phelan et al. |
| 2002/0147677 A1 | 10/2002 | Brady |
| 2002/0169747 A1 | 11/2002 | Chapman et al. |
| 2002/0198831 A1 | 12/2002 | Patricelli et al. |
| 2003/0093289 A1 | 5/2003 | Thornley et al. |
| 2003/0149653 A1* | 8/2003 | Penney et al. ............... 705/37 |
| 2003/0220806 A1 | 11/2003 | Hoffman et al. |
| 2004/0088253 A1 | 5/2004 | Crispyn et al. |
| 2004/0111362 A1 | 6/2004 | Nathans et al. |
| 2004/0186807 A1 | 9/2004 | Nathans et al. |
| 2007/0067235 A1 | 3/2007 | Nathans et al. |
| 2008/0027859 A1 | 1/2008 | Nathans et al. |

FOREIGN PATENT DOCUMENTS

| | | |
|---|---|---|
| WO | WO0159670 A1 * | 8/2001 |

OTHER PUBLICATIONS

"RentPort launches the first and only business solution; making rent reportable and rewardable", Business Editors, Business Wire, New York: Aug. 7, 2000.*

Graves, S., "Company Aims to Ease Rental Problems for All Rentport Creates Credit for Renters", The Press Democrat, Santa Rosa, Calif., Aug. 19, 2000, p. R1.*

O'Sullivan, Orla "Keeping a Hold of Wholesale Payments" Apr. 1999, US Banker.*

Gamble, Richard "Lockbox Technology" Jan. 2001, Business Credit, 103, 1,.24.*

Clemans, T., et al., "The National Credit Reporting Association and PRBC Join Forces to Help Consumers to Build Alternative Credit Histories," The National Credit Reporting Association, Inc., PRBC-Paymen Reporting Builds Credit, Oct. 3, 2005.

Cisneros, et al., "Opportunity and Progress, A Bipartisan Platform for National Housing Policy," Special Preview Addition, Joint Center for Housing Studies of Harvard University, 2004.

Gamble, R., "Lockbox Technology," Business Credit, 103(1):24, Jan. 2001.

Kessler, J., "Giving Credit Where Credit Is Due: Solutions for Evaluating Thin File Consumers," Purchase Street Research, Jul. 2004.

Lindenmayer, I., "Account Now to Send Bureau Data on Online Bill Payments," American Banker Online, Nov. 23, 2005.

Nathans, M., et al., "Proposal for: Corestates Bank Multifamily Banking System," Nov. 1992.

O'Sullivan, O., "Keeping a Hold of Wholesale Payments," U.S. Banker, Apr. 1999.

http://www.bankrate.com/brm/news/debt/debtcreditguide/new-scoring1.asp—Anna Afshar, "Use of Alternative Credit Data Offers Promise, Raises Issues," Federal Reserve Bank of Boston, Issue 1, Third Quarter, 2005.

http://www.prbc.com/pub/JCHS_POLICY_BOOK_PRBC_excerpt.pdf—Pay Rent, Build Credit: A Nontraditional Approach to Credit, p. 44.

http://www.bankrate.com/brm/news/debt/debtcreditguide/new-scoring1.asp—Amy Buttell Crane, Bankrate.com, "New Scoring Tools Empower Credit Weaklings," as printed Dec. 2, 2005.

http://www.payrentbuildcredit.com/partners/bps.asp, as printed Oct. 23, 2004.

http://www.payrentbuildcredit.com/partners/achievers.asp, as printed Oct. 23, 2004.

http://www.prbc.com/main.about/opinions.asp, as printed Oct. 22, 2004.

http://www.prbc.com/main/about/ffr-200406.asp, as printed Oct. 22, 2004.

http://www.prbc.com/main/about/in-20040820.asp, as printed Oct. 22, 2004.

http://www.prbc.com/main/about/wp-20040222.asp, as printed Oct. 22, 2004.

http://www.prbc.com/main/about/wp-20040110.asp, as printed Oct. 22, 2004.

http://www.prbc.com/main/about/aec-2003.asp, as printed Oct. 22, 2004.

http://www.prbc.com/main/about/abm-20021101.asp, as printed Oct. 22, 2004.

http://www.prbc.com/main/about/nhi-20021001.asp, as printed Oct. 22, 2004.

http://www.prbc.com/main/about/hdr-20020902.asp, as printed Oct. 22, 2004.

http://www.prbc.com/main/about/ppi-20020219.asp, as printed Oct. 22, 2004.

http://www.prbc.com/main/about/prbc-20031219.asp, as printed Oct. 22, 2004.

http://www.prbc.com/main/about/prbc-20040602.asp, as printed Oct. 22, 2004.

http://www.prbc.com/main/about/prbc-20040728.asp, as printed Oct. 22, 2004.

file://C:/DOCUME~1/MICHAE~1/LOCALS~1/Temp/HDKQN05W.htm, as printed Oct. 22, 2004.

PRBC Data Model, Release 1.0, 2004.

Afshar, A., "Use of Alternative Credit Data Offers Promise, Raises Issues" New England Community Developments, Federal Reserve Bank of Boston, Issue 1, Third Quarter, 2005.

Cabral, E., "Building Assets: Making Rent Count," Ford Foundation Report Online, http://www.fordfound.org/publications/ff_report/view_ff_report_detail.cfm?report_index=513, 2004.

Crane, A.B., "New Scoring Tools Empower Credit Wealkings," Bankrate.com, <http://www.bankrate.com/brm/news/debt/debtcreditguide/new-scoring1.asp>, Nov. 1, 2005.

Demby, E.R., "A New Approach to Credit Reporting," Credit Card Management, vol, 11, No. 6, pp. 56-58, Sep. 1998.

Harney, K.R., "The Nation's Housing: Renters Soon Get a Chance to Boost Credit Records," Washington Post, p. F01, Jan. 10, 2004.

Kim, A., "Giving Credit Where It's Due: Finding New Ways to Build Credit Can Help Low-Income Consumers Buy Homes," Progressive Policy Institute Online, http://www.ppionline.org/ppi_ci.cfm?knlgAreaID=114&subsecid=236&contentid=250212, Feb. 19, 2002.

Peterson, S., "Credit Scores for Overlooked Borrowers," Inman News, Aug. 20, 2004.

Singletary, M., "The Color of Money: Earning Credit for Paying Rent," Washington Post, pp. F01, Feb. 22, 2004.

Thompson; L.K., "Renters Getting a Chance to Make Credit (Report) History," American Banker, Nov. 1, 2002.

"Pay Rent, Build Credit, A Nontraditional Approach to Credit," <http://www.prbc.com/pub/JCHS_POLICY_BOOK_PRBC_excerpt.pdf>, p. 44.

"PRBC Bill Payment Scorecard," <http://www.payrentbuildcredit.com/partners/bps.asp>, Jul. 18, 2004.

"PRBC Achievers 100+," <http://www.payrentbuildcredit.com/partners/achievers.asp>, as printed Oct. 23, 2004.

"What people are saying . . . ," <http://www.prbc.com/main/about/opinions.asp>, as printed Oct. 22, 2004.

"Credit Building," Annie E. Casey 2003 Kids Count Data Book, p. 224, 2003.

"Renters Can Build Credit," National Housing Institute, Issue 125, Sep./Oct. 2002.

"Annapolis Firm Plans Program to Help Renters Establish Credit by Making Payments Through Banks," Ideas and Trends, vol. 30, No. CD-9, p. 265, Sep. 2, 2002.

Press Release: "Pay Rent, Build Credit Becomes the First Credit Bureau to Allow Consumers and Business to Build Credit Scores With Rental Payments, as Homeowners Do With Mortgage Payments," Dec. 9, 2003.

Press Release: Jun. 2, 2004, <http://www.prbc.com/main/about/prbc-20040602.asp>, as printed Oct. 22, 2004.

Press Release: "Embargoed for Release at the Inman Real Estate Connect 2004 Press Conference," Jul. 28, 2004.

"Consumer Enrollment by State," file://C:/DOCUME~1/LOCALS~1/Temp/HDKQNO5W.htm, Oct. 22, 2004.

File Wrapper of U.S. Appl. No. 11/830,536.

File Wrapper of U.S. Appl. No. 10/392,849.

File Wrapper of U.S. Appl. No. 10/309,018.

* cited by examiner

PREFERRED CREDIT INFORMATION DATA COLLECTION METHOD

CROSS REFERENCE TO RELATED APPLICATIONS

This application claims priority from U.S. application Ser. No. 10/309,018, filed Dec. 4, 2002, the entirety of which is incorporated herein by reference.

BACKGROUND OF THE INVENTION

The present invention relates generally to the field of consumer credit reporting and more particularly to the field of credit payment data collection and verification methods.

Traditional consumer credit payment data collection methods rely on obtaining payment information from the creditor. Using the traditional approach, creditors report payments either as "on time" or "late" in 30 day increments.

The problem with the traditional methodology is that many smaller creditors and "non-traditional" creditors such as apartment rental landlords, utility and telephone service providers do not report to traditional credit bureaus because of technical barriers and/or lack of convenience. This condition causes many borrowers that faithfully pay on time to not receive that recognition by automated credit underwriting technologies that rely on automated payment data from the credit bureaus.

Distinct social and racial disparities associated with otherwise effective automated underwriting credit risk management technology have been observed since the introduction of this technology, especially in connection with "traditional" credit data collection and reporting practices. For example, the current housing credit application process for both residential residential leases and mortgages often presents a daunting problem to low and moderate income consumers, first-time homebuyers, and consumers with rehabilitated credit. In order to qualify for housing credit, such consumers must establish credit-worthiness using "traditional" credit instruments and payment history collection and reporting practices. However, the "traditional" methods used to establish credit-worthiness present distinct unfair disadvantages, especially to fiscally responsible low- and moderate-income consumers who pay their residential rent or mortgage, utilities, phone, retail credit bills on time, but who do not have other lines of credit. FICO (Fair, Isaac & Co.) credit scores are automatically calculated by "traditional" credit bureaus for their subscribers using FICO's proprietary algorithms. These credit scores are in turn used by automated mortgage underwriting and lease application scoring models to establish credit-worthiness and ultimately determine the likelihood of default, and whether the applicant will qualify for the housing credit sought.

One of the problems associated with "traditional" credit reporting methods is that no effort has been made in the market to systematically (i) collect residential rental lease, utility, or telephone payment data, (ii) assure data quality, (iii) prevent the effective prejudice of consumer's rights in the data collection process, and (iv) reduce the cost of processing payments. And in many cases, no effort has been made to collect residential mortgage payment data from so-called "subprime" lenders while assuring privacy of the creditor/debtor relationship. The FICO scores generated for low- and moderate-income consumers who do not have "traditional" lines of credit, do not own their own homes, and/or whose mortgages are serviced by a non-reporting mortgage servicer are therefore based solely on "traditional" credit history (which is defined as credit for retail goods and services such as car loans or credit cards) and often do not include "housing" credit history (which is defined as residential lease or mortgage payments and other housing-related payments such as mobile home pad rent, rent, condominium, and cooperative, payments).

"Traditional" consumer credit data collection, management, and reporting practices are a problem in connection with housing credit for three (3) reasons. First, the FICO scores for low and moderate income consumers who make their residential lease, utility, and telephone payments on time are lower than they should be. Second, FICO scores that are based solely on retail (non-housing) credit information are not as accurate in predicting the likelihood of default on a residential mortgage or lease as a credit score in which housing credit data (if electronically accessible) is assessed and more heavily weighted than the retail credit data. This is because the correlation between an applicant's past housing credit payment behavior and their future housing credit payment behavior is believed to be a stronger default indicator than the correlation between past "traditional" (retail credit only) payment behavior and future housing credit payment behavior.

Yet another problem with the current system is that there is no check of the accuracy of the payment information that is reported to "traditional" credit bureaus. This is problematic for two reasons. First, it subjects consumers to potentially unscrupulous and unilateral payment reporting actions of creditors. Second, and of greatest concern, a consumer who rightfully withholds a payment due to a legitimate dispute (such as a landlord's failure to provide heat in the winter, running water, or sanitary plumbing) can receive a "black mark" using "traditional" credit reporting methods, and have their credit damaged for many years because of the rightful withholding of payment. This potential threat effectively prejudices a consumer's legal rights in a residential lease transaction using "traditional" credit reporting methods.

The Preferred Credit Information (PCI) Data Collection Methodology is an equitable and cost-effective system and method that uniquely addresses the aforementioned problems, and mitigates the social and racial disparities associated with automated underwriting technology.

SUMMARY OF THE INVENTION

The present invention provides a system and method for processing payments, resolving disputes, and collecting credit payment history information. The invention lowers barriers to credit that are presented by prior art techniques for consumers who pay their residential rent, mortgage, utilities, and phone bills on time by collecting, managing, and making this payment history data electronically available to authorized subscribers. Subscriber creditors may rely on data collected, managed and made available by the invention as inputs to drive their automated credit scoring and underwriting models.

In one aspect of the invention, a creditor creates a lock box at a financial institution such as a bank. The lock box includes an escrow provision under which a consumer can designate payments to be held in escrow under certain pre-defined conditions (e.g., some breach of contract by an apartment landlord, such as failure to provide hot water, or the institution of a suit between the landlord and tenant). A consumer makes payments to the financial institution and designates the payment either for the creditor's lock box or for the escrow account. The financial institution applies non-escrowed funds to the creditor's account and reports all payments (whether escrowed or not) to the creditor and to a centralized data repository. In this manner, the consumer is able to build a positive credit history as timely payments will be reflected in the repository's records. The consumer is also provided with a mechanism for maintaining a positive credit history in the event of a dispute with a creditor by continuing to make timely payments and designating them for the escrow account.

In another aspect of the invention, all credit data maintained in the data repository is maintained securely and will not be released without the consent of the consumer. This benefits consumers in that it prevents their credit information from being sold without their express consent. This reduces the flow of unwanted junk mail and telephone calls from other lenders. This also protects the creditor as it reduces the flow of information to competitors.

In another aspect of the invention, the credit data maintained in the repository is used to report a residential housing score in which residential housing credit payment history is more heavily weighted than retail credit payment history. In some embodiments, the residential housing credit payments include mortgage, lease, utility, and phone bill payment information. The inducement for mortgage servicers to report mortgage payment information is provided by protecting the confidentiality of the creditor/debtor relationship, and by allowing mortgage services who do report payment information to access the information in a single centralized housing credit repository with the consent of the consumer. For housing credit risk management, this credit information adds considerable value to credit scores from "traditional" credit bureaus because it includes residential housing credit information, which is more predictive of future housing credit payment behavior than the information "traditionally" available from credit bureaus.

Another aspect of the invention provides a security system to protect against unauthorized release of a consumer's credit data from the repository. In preferred embodiments of the invention, each consumer is provided with a a PIN (personal identification number) and a password. Furthermore, member creditors are assigned Subscriber numbers, which are to be maintained in confidence. Member Subscribers are creditors who have registered with the data repository and who have legitimate credit risk management needs for the information, e.g., landlords, mortgage lenders, etc. In order for any consumer credit information from the repository to be transferred to any creditor, the consumer must authorize the release of the information to that creditor.

BRIEF DESCRIPTION OF THE DRAWINGS

A more complete appreciation of the invention and many of the attendant advantages and features thereof will be readily obtained as the same becomes better understood by reference to the following detailed description when considered in connection with the accompanying drawings, wherein.

DETAILED DESCRIPTION

The present invention will be discussed with reference to preferred embodiments of methods and systems for collecting and distributing credit payment data. Specific details, such as types of data collected and dispute resolution mechanisms, are set forth in order to provide a thorough understanding of the present invention. The preferred embodiments discussed herein should not be understood to limit the invention. Furthermore, for ease of understanding, certain method steps are delineated as separate steps; however, these steps should not be construed as necessarily distinct nor order dependent in their performance.

Figure 1:
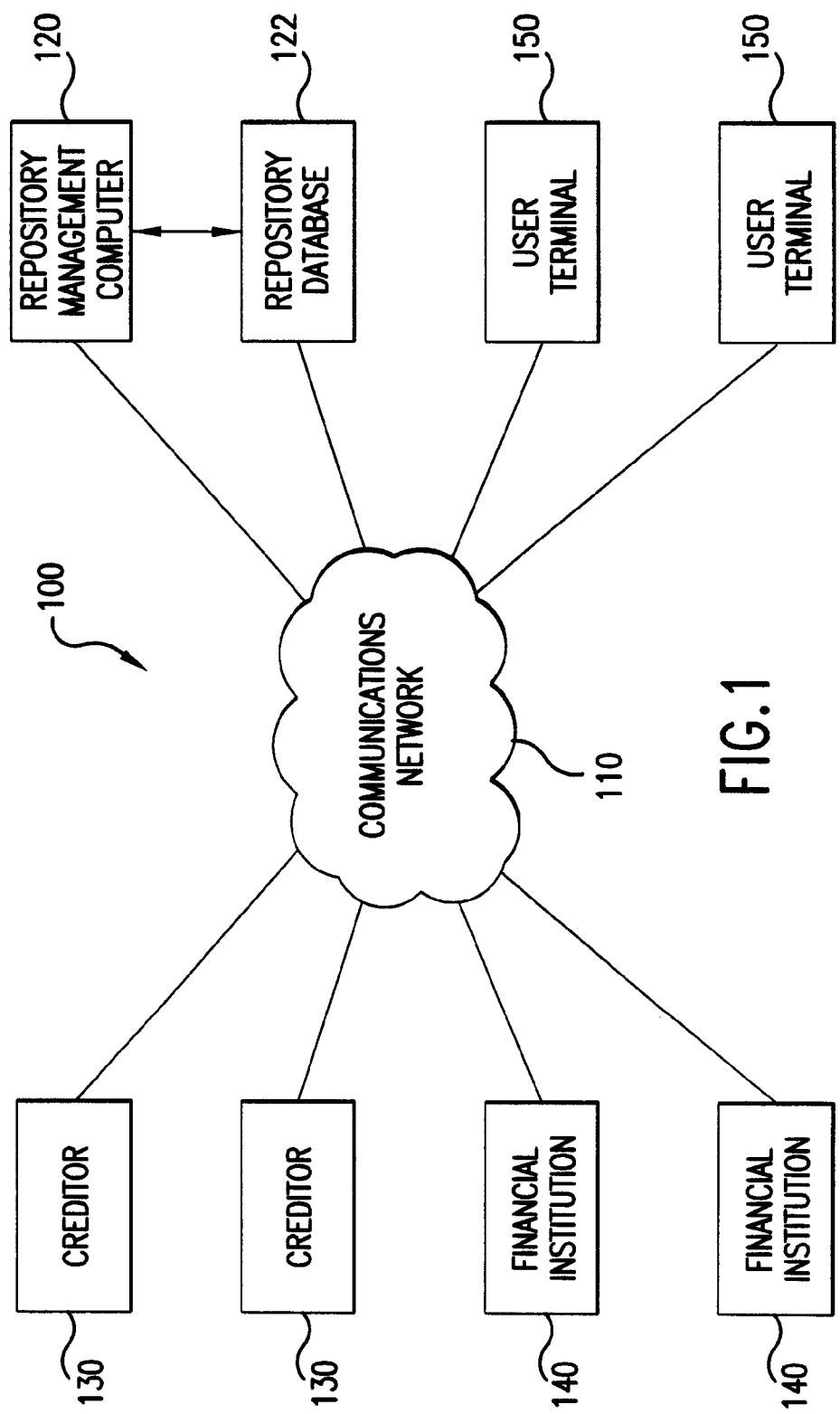
FIG. 1 is a system diagram illustrating the interconnection of a residential housing credit management computer with other computers according to one embodiment of the present invention.

An exemplary system 100 according to the present invention is illustrated in FIG. 1. The system 100 includes a repository management computer 120 connected to a repository database 122. The repository database 122 holds credit payment data. Preferably, in the context of residential housing credit, the data includes the following records:

A Consumer Personal Information:
    Consumer Name:
        First
        Last
        Middle Initial
        Maiden
    Consumer Date of Birth (mm/dd/yy)
    Consumer bioprint (signature, retina, finger, etc.)
    Consumer Address:
        Number
        Street Name
        Unit Number
        Building Name
        City
        Country
        State
        Zip Code
    Consumer Address "As of" Date (mm/dd/yy)
    Consumer Repository Account Number
    Consumer PIN
    Consumer Password (e.g., mother's maiden name)
    Number of months as repository member
    Number of consecutive on-time full payments
    Number of escrow deposits
    Number of Court Filings (w/ruling)
    Delinquency frequency last 12/24 months:
        30 days; 60 days; 90 days; 120 days
    Average payment date 0-90 for 12 months/24 months/overall B Consumer Loan Information:
    Creditor Type (mortgage loan, home equity loan, apartment lease, mobile home pad, condominium, cooperative, utility or phone company, etc.)
    Required Payment Amount
    Required Payment Frequency
    Credit Term
    Required Payment Due DateCreditor Name
    Loan ID number
    Creditor Account Number (to which to credit payments)
    Original Term
    Remaining Term
    Renewal Dates
    Extension Dates Modification Terms and Dates
Security Deposit Amounts C Payment Information:
   Date on which payment was received
   Time at which payment was received
   Amount of payment received
   Creditor Name
   Loan ID Number:
   Difference (in dollars) between required and actual payment
   Difference (percent) between required and actual payment
   Difference in days between date payment was made and due date D Creditor Information
   Creditor Name
   Creditor EIN
   Creditor Address:
      Number
      Street Name
      Unit Number
      Building Name
      City
      Country
      State
      Zip Code
   Creditor Servicing Contact Name (if different):
      Contact Phone Number
      Contact email address
   Creditor assigned Consumer Account Number(s)
   Creditor Repository Data Reporting ID Number
   Creditor Repository Data Subscriber ID Number
   Creditor Repository Data Reporting Trustee Name (i.e., bank lock box service provider)
   Creditor Repository Data Reporting Trustee ID Number
   Creditor Repository Data Reporting:
      Contact Name
      Contact Phone Number
      Mailing Address
      E-mail Address
      Contact Password The repository management computer 120 acts as a gatekeeper to ensure that any information entering the repository database 122 is valid and, more importantly, that only properly authorized consumer credit information enters and leaves the repository database 122.

The repository management computer 120 is connected to a secure communications network 110. The communications network 110 may be any form of secure communications network, and preferably comprises the Internet. Those of skill in the art will recognize that many possible forms of secure communications networks are possible. These different forms will not be discussed in further detail herein to avoid obscuring the present invention. Also connected to the communications network 110 are a plurality of creditor computers 130, financial institution computers 140, and user terminals 150. Creditor computers 130 provide a means by which creditors can make requests for credit payment information from the repository management computer 120. Financial institution computers 140 report payments to the repository management computer 120. User terminals 150 allow users to authorize release of their credit data to residential housing credit providers and allow consumers to obtain copies of their records from the repository. It should be understood that a single computer or computer system can perform one or more of the functions of the devices shown in FIG. 1. For example, the repository management computer 120 and the repository database 122 may both be present in a single computer or computer system. Similarly, the functions of the creditor computers 130 and user terminals 150 may be combined in a single computer or system as described below.

Figure 2:
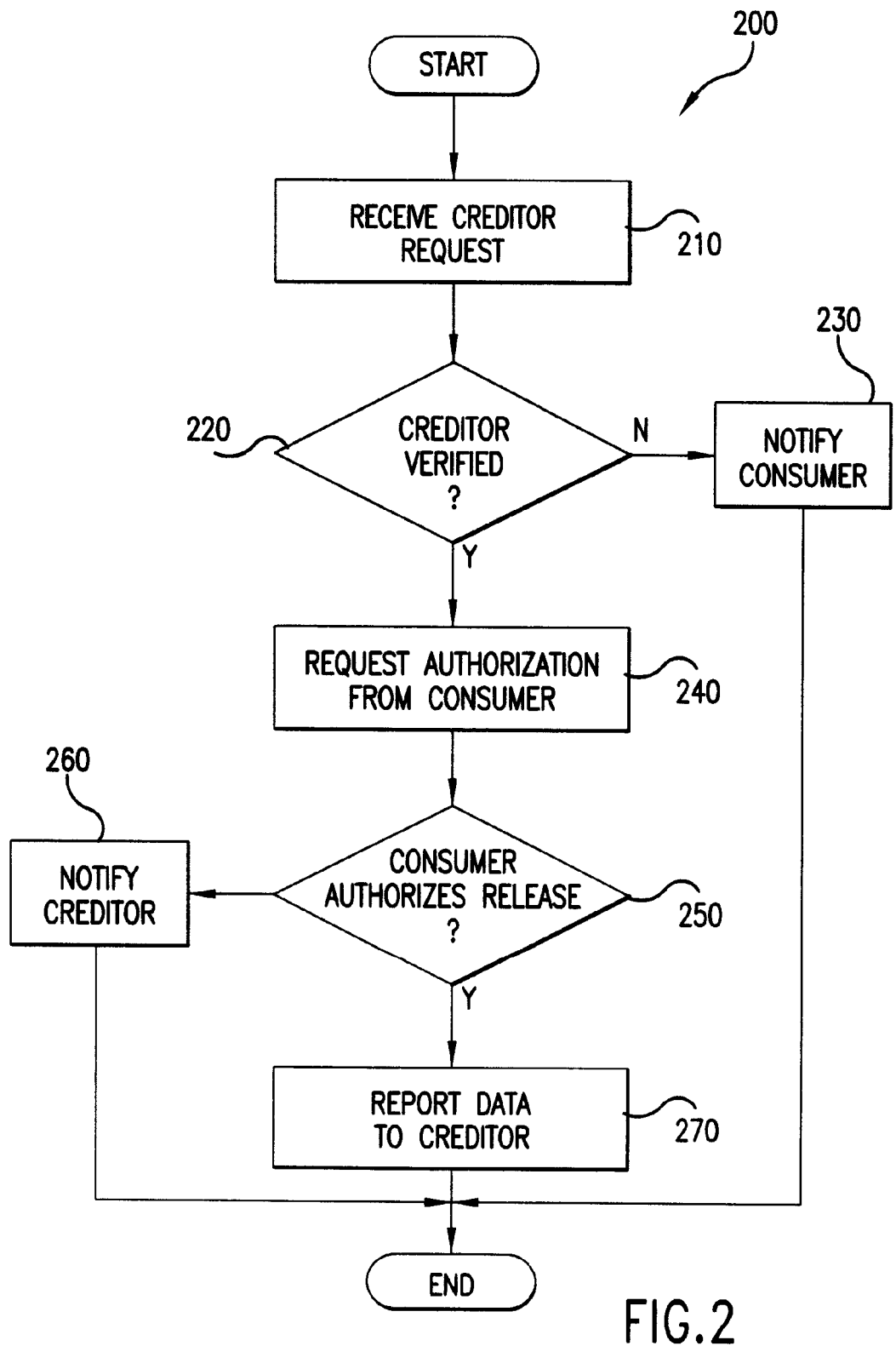
FIG. 2 is a flowchart illustrating a credit data request process according to an embodiment of the present invention.

The processing that occurs at the repository management computer 120 when a consumer applies for credit is illustrated in the flowchart 200 of FIG. 2. The repository management computer 120 receives a request for credit data at step 210. The repository management computer 120 verifies the request at step 220. In some embodiments, the verification procedure includes some or all of the following checks: the Creditor Repository Data Subscriber ID Number must match the number maintained in the database 122; the Creditor Repository Data Reporting Contact Name associated with the request must match the Creditor Repository Data Reporting Contact Name in the database 122; and a password provided with the request must match the Creditor Repository Data Reporting Contact Password in the database 122. If the verification process fails, a notice of the unauthorized attempt is sent to the consumer whose credit was requested at step 230 and the process ends. The notification may be viewed in real time using the internet, or by telephone, email, regular mail, or any other means.

If the verification process is successful, authorization is requested from the consumer at step 240. The request may be processed in real time using the internet, come by telephone, mail, email, or any other means. Additionally, in some embodiments, it is possible for a consumer to pre-authorize the release of credit data. One important aspect of the invention is the security of the data. As discussed above, in preferred embodiments of the invention, consumers are provided with a PIN number and password that must be used in order to successfully authorize the release of the consumer's credit data. Other identification techniques (e.g., digital signature recognition, retinal or finger scan) may be employed in alternative embodiments.

It should be noted that it is also possible for a credit provider to obtain the consumer's authorization and submit the authorization along with the creditor request. When a consumer applies for credit, the consumer authorizes the creditor to check the credit bureaus along with the PCI data repository.

If the release of the data has been not authorized at step 250, a notice is sent to the creditor at step 260. If the release of the data has been authorized at step 260, the data is reported to the creditor at step 270. The report is preferably sent electronically, but may be sent by other means including fax and mail. The credit provider then uses this information in determining whether or not to extend credit to the consumer, and/or how to price the credit. It should be understood that references to reporting the data to a creditor includes reporting the data to an application processor designated by the creditor rather than to the creditor itself.

If the consumer's application is accepted, the creditor creates an account for the consumer to use with the creditor's lock box at the creditor's bank or other financial institution of the creditor's choice. The consumer then begins sending regular payments to the creditor's lock box. These payments can include monthly mortgage payments in the case of a mortgage, lease payments and security deposits in the case of a lease, utility, and phone bill payments.

Figure 3:
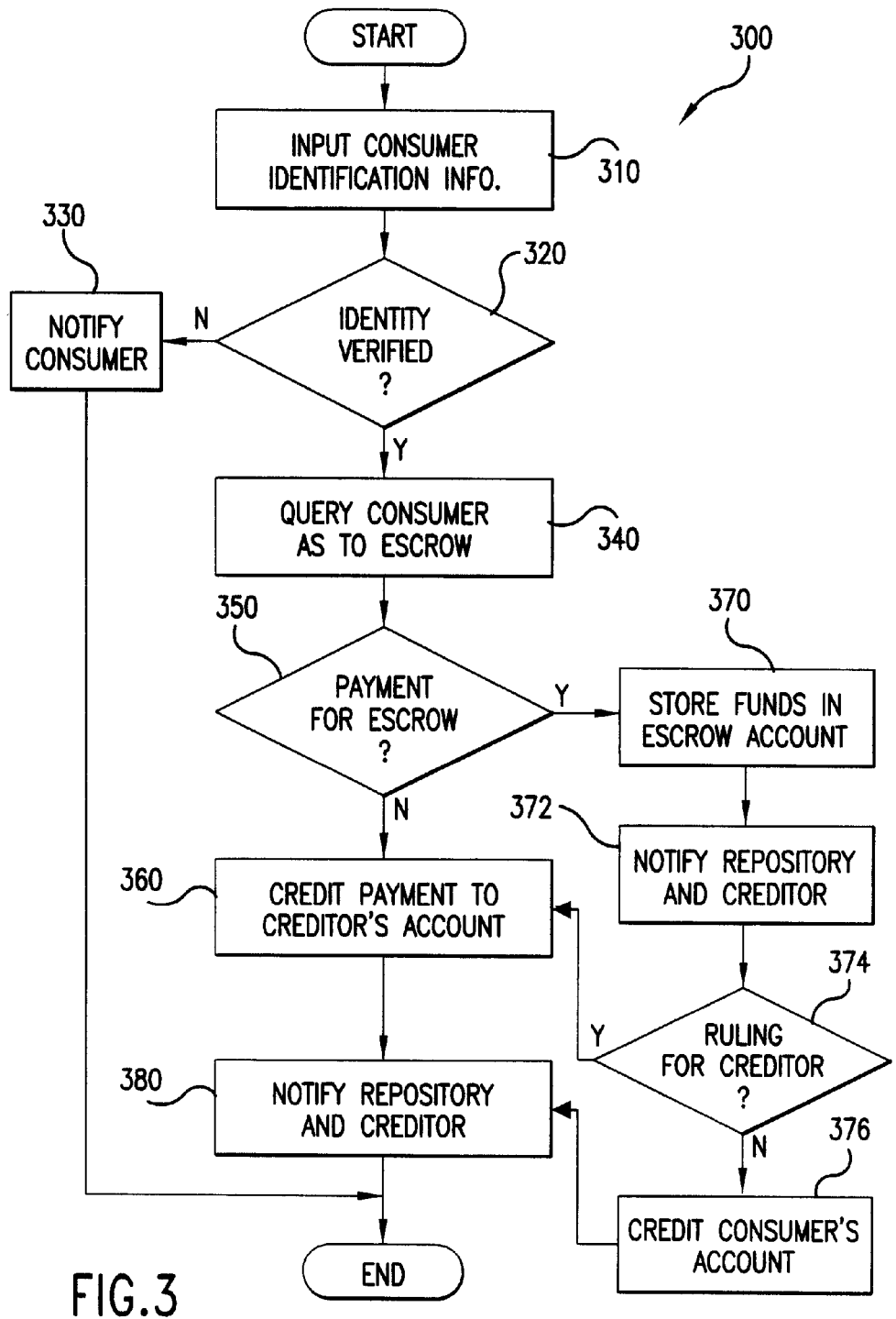
FIG. 3 is a flow chart illustrating residential housing credit payment processing according to an embodiment of the present invention.

The processing performed by the bank/financial institution computer 140 is illustrated in the flowchart 300 of FIG. 3. When making a payment, the consumer's identification information is input at step 310. The identification information may be input by swiping a striped card in a card reader, by entering an account number, or other means. The emphasis in this step is properly identifying the consumer so that the payment made by the consumer is sent to the correct creditor and so that the consumer gets the proper credit for making the payment. Accordingly, in some embodiments, entry of a password or PIN is not required at this step. If the identification of the consumer is not verified at step 320, the consumer is notified at step 330 and the process ends.

If the identification of the consumer is verified at step 320, the consumer is given the option of designating the payment as a disputed sum and directing the bank to hold the payment in escrow at step 340. This could occur, in the context of residential housing for example, in a case where a tenant wishes to withhold a lease payment from a landlord because the landlord has failed to provide heat to the apartment. Without the present invention, consumer's rights are effectively prejudiced in a residential lease transaction because a consumer in this situation faces the unenviable choice of making the lease payment to the landlord (thereby losing "leverage" with the landlord to make the repair) or withholding the payment at the risk of receiving a "black mark" in their credit file and potential long term damage to their credit history. By allowing the funds to be directed toward the escrow account, the consumer gets the benefit of showing a timely payment while maintaining the leverage that may be needed to obtain compliance with the lease terms by the lessor. In preferred embodiments of the invention, the conditions under which payments may be designated for escrow and the conditions under which the payments will be released to the creditor or the consumer will be set forth in a written tri-party escrow agreement between the lessor, lessee, and the trust department of the lessor's financial institution.

Payments that are not designated for escrow at step 350 are immediately credited to the creditor's designated account at step 360. Payments that are designated for escrow by the consumer will be stored in the escrow account at step 370 and a notification will be sent to the repository and to the creditor at step 372.

The funds will be held by the bank until the escrow agent is directed to release consumer the funds in accordance with a ruling by a landlord/tenant court, or by a mutually accepted arbitrator, or on some other event agreed upon by the parties. One example of such an event is an adjudication of the dispute by a court of competent jurisdiction. In some preferred embodiments, the consumer is provided with a special code by the bank upon directing a payment to escrow; when the dispute has been resolved (e.g., heat is restored) and the consumer wishes to release the funds to the creditor, the consumer can call a voice automated telephone system maintained by the bank and enter the special code, at which point the bank will release the funds to the creditor. The release event may also comprise an arbitration of the dispute by an entity associated with the repository or some other organization. If the release event (adjudication, arbitration, release by consumer, or other agreed-upon event) indicates that the funds should be released to the creditor at step 374, the payment is credited to the creditor's account at step 360; otherwise, the consumer's account is credited at credited at step 376.

In either event, the bank will also generate a payment report and send the report to the creditor and to the repository management computer 120 at step 380. The payment reporting to the creditor and to the repository includes adjudication or arbitration results in the event payments are escrowed, and the repository tracks the number of times payments are escrowed by the consumer, and what the resolution results are. To the extent that consumers abuse the escrow feature, this information will also be available to future potential creditors.

The bank may charge a fee for its collection and accounting services in some embodiments. This fee provides incentive for the banks to participate in the payment and reporting process. However, this fee will almost certainly be less than the cost that would be incurred by the creditor to handle the payment on its way to the bank. In a sense, the payment collection and accounting services have been outsourced to the bank. In other embodiments, reduced fees will be charged by the banks. In such embodiments, the incentive for the banks comes from the opportunity to attract potential customers that results from consumers being present at the bank when making housing payments. Additional incentive for the bank or other financial institution arises in connection with the Community Reinvestment Act (CRA). In a written opinion expressed by the Federal Reserve Board of Governors, Division of Consumer and Community Affairs, banks can receive favorable "community development service" consideration when they use their lock box payment processing and information reporting technology to assist low and moderate income apartment renters to build accurate credit histories.

In some embodiments, a consumer can make a payment using an automated clearing house (ACH) transaction or an ATM (automated teller machine) in the same manner in which such networks are used to make deposits and pay bills. The appropriate account (creditor or escrow) is then credited and notification of the payment is sent to the repository management computer 120 for storage in the database 122. In preferred embodiments, the ATM, or the financial institution's bank by phone or internet system can alternatively be used to electronically transfer funds from the consumer's account to the creditor's account at greatly reduced processing cost.

The repository management computer 120 uses the bank report to maintain the payment history information for the consumer in the database 122. The consumer can obtain this information from the repository using a secure Internet connection at no charge. This allows the consumer to verify that the information is correct. This payment information will be added to existing payment information for use when the consumer next makes an application for credit.

Obviously, numerous other modifications and variations of the present invention are possible in light of the above teachings. It should be understood that the invention may be applied to a wide range of credit situations, including residential housing credit, utility credit, retail credit including automobile and furniture loans and credit cards, etc. It is therefore to be understood that within the scope of the appended claims, the invention may be practiced otherwise than as specifically described herein.

What is claimed is:

1. An apparatus for collecting and reporting payment information comprising:
    an electronic storage medium, the storage medium having stored therein payment terms including an amount due and a date on which the amount is due, the payment terms pertaining to a plurality of consumers and a plurality of payees; and
    a processor, the processor being configured to perform the steps of:
        collecting and storing on the storage medium actual payment data from payment processors, the actual payment data pertaining to actual payments made on behalf of a consumer, the actual payment data including an amount paid and a date on which the amount was paid for each payment;
        making a comparison of the actual payment data to the payment terms; and reporting, to a party other than a party to whom the payment was due, an indication of a timeliness of the actual payments.

2. The apparatus of claim 1, wherein the payment terms are residential housing credit terms.

3. The apparatus of claim 1, wherein the payment terms are utility payment terms.

4. The apparatus of claim 1, wherein the payment terms are retail credit terms.

5. The apparatus of claim 4, wherein the retail credit terms are automobile credit terms.

6. The apparatus of claim 4, wherein the retail credit terms are consumer finance credit terms.

7. The apparatus of claim 1, wherein the indication comprises a credit score.

8. The apparatus of claim 1, wherein the reporting step is only performed if the consumer to whom the indication pertains authorizes the release of the indication.

9. The apparatus of claim 1, wherein the processor is configured to receive an indication that the payments made by the consumer have been designated by the consumer as disputed and held in a lock box.

10. The apparatus of claim 7, wherein the processor is configured to weigh residential housing credit payment data more heavily than retail credit payment data.

11. The apparatus of claim 8, wherein the authorization from the consumer is a preauthorization.

12. The apparatus of claim 1, wherein the payment processor is a party other than a party to whom the payment was due.

* * * * *